United States Patent
Fan

(10) Patent No.: US 9,618,667 B2
(45) Date of Patent: Apr. 11, 2017

(54) METHOD OF FORMING QR FILMS AND QR LIGHT-EMITTING DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 50 days.

(21) Appl. No.: 14/771,176

(22) PCT Filed: Jul. 31, 2015

(86) PCT No.: PCT/CN2015/085713
§ 371 (c)(1),
(2) Date: Aug. 27, 2015

(87) PCT Pub. No.: WO2017/015974
PCT Pub. Date: Feb. 2, 2017

(65) Prior Publication Data
US 2017/0031075 A1  Feb. 2, 2017

(30) Foreign Application Priority Data

Jul. 29, 2015  (CN) .......................... 2015 1 0455837

(51) Int. Cl.
*G02B 5/30* (2006.01)
*F21V 9/14* (2006.01)

(52) U.S. Cl.
CPC .............. *G02B 5/3033* (2013.01); *F21V 9/14* (2013.01)

(58) Field of Classification Search
CPC ................................. G02B 5/3033; F21V 9/14
See application file for complete search history.

(56) References Cited

U.S. PATENT DOCUMENTS

| | | | |
|---|---|---|---|
| 8,471,969 B2* | 6/2013 | Banin | B82Y 20/00 349/17 |
| 9,164,353 B2* | 10/2015 | Jeon II | G02F 2/02 |
| 2013/0341588 A1* | 12/2013 | Jeon II | G02F 1/174 257/13 |
| 2014/0145144 A1* | 5/2014 | Jeong | H01L 29/125 257/13 |
| 2015/0009440 A1* | 1/2015 | Lee | G02F 2/02 349/42 |
| 2015/0146452 A1* | 5/2015 | Kim | F21V 9/14 362/611 |

* cited by examiner

*Primary Examiner* — Mary Ellen Bowman
(74) *Attorney, Agent, or Firm* — Andrew C. Cheng

(57) ABSTRACT

A method of forming quantum rod (QR) films includes: forming a transmissive film on a substrate; forming a plurality of stripe-shaped slots on the transmissive film; forming a QR layer on an alignment film, the QR layer comprising curing adhesives, and QRs and electric field-sensing monomers doped in the curing adhesives; applying an electrical field on the QR layer, so that under the effect of the electric field, the electric field-sensing monomers drive the QRs aligning with the plurality of stripe-shaped slots; and curing the curing adhesive so to bind the QRs. The present invention also proposes a QR light-emitting display device having a QR film made by the above mention method. The alignment of the long axes of QRs would be improved. It would enhance the luminance of the light emitted from the light-emitting side of the QR film.

12 Claims, 3 Drawing Sheets

METHOD OF FORMING QR FILMS AND QR LIGHT-EMITTING DISPLAY DEVICE

BACKGROUND OF THE INVENTION

1. Field of the Invention

The present invention relates to display technology, and more specifically, to a method of forming quantum rod (QR) films and QR light-emitting display device.

2. Description of the Prior Art

Quantum rods (QRs), like quantum dots (QDs), can be formed in nano-size. Because of the effect of quantum confinement on electrons and holes, the continuous electronic band structure of QRs turns into a discrete energy level structure with molecular characteristics. Therefore, ORs can emit fluorescence once being excited. Currently, QRs are mostly applied to form optical thin films, also known as QR films. When rays of light reach the optical thin film, the light of certain wavelengths would be turned into partially polarized light of another wavelength because of the polarization properties of the QRs. Given that the polarized light emitted through the QR film is the brightest when parallel to the long axis of the QR, the brighter the polarized light would be when the long axes of QRs are better aligned, and a light-emitting display device can reduce more energy consumption if such QR film is adopted.

SUMMARY OF THE INVENTION

The embodiment of the present invention provides a method of forming QR films and QR light-emitting display device, which can enhance the alignment of the long axes of the QRs.

According to the present invention, a method of forming quantum rod (QR) films, comprises: forming a transmissive film on a substrate; making use of a mask to imprint the transmissive film so to form a plurality of stripe-shaped slots on the transmissive film, wherein the mask has a pattern complimentary to the stripe-shaped slots, with an extending direction of the stripe-shaped slots parallel to each other, and a width of the slots being nano-sized; forming a QR layer on an alignment film, wherein the QR layer comprises curing adhesives, and QRs and electric field-sensing monomers doped in the curing adhesives; applying an electrical field that is perpendicular to a surface of the substrate to the QR layer, so that under the effect of the electric field, the electric field-sensing monomers drive long axes of the QRs aligning with the extending direction of the plurality of stripe-shaped slots; curing the curing adhesive so to bind the QRs; and attaching a protective substrate on the QR layer.

In one aspect of the present invention, the QR film comprises a polyimide (PI) alignment film and a polarizer.

According to the present invention, a method of forming quantum rod (QR) films, comprises: forming a transmissive film on a substrate; forming a plurality of stripe-shaped slots on the transmissive film; forming a QR layer on an alignment film, the QR layer comprising curing adhesives, and QRs and electric field-sensing monomers doped in the curing adhesives; applying an electrical field on the QR layer, so that under the effect of the electric field, the electric field-sensing monomers drive the QRs aligning with the plurality of stripe-shaped slots; and curing the curing adhesive so to bind the QRs.

In one aspect of the present invention, a step of forming a plurality of stripe-shaped slots on the transmissive film comprises: making use of a mask to imprint the transmissive film so to form a plurality of stripe-shaped slots on the transmissive film, the mask having a pattern complimentary to the stripe-shaped slots.

In another aspect of the present invention, an extending direction of the stripe-shaped slots parallel to each other, and widths of the slots are nano-sized, and a step of applying an electrical field on the QR layer comprises: under the effect of the electric field, the electric field-sensing monomers drive long axes of the QRs aligning with an extending direction of the plurality of stripe-shaped slots.

In another aspect of the present invention, the step of applying an electrical field on the QR layer comprises: setting a direction of the electrical field to be perpendicular to a surface of the substrate to the QR layer.

In still another aspect of the present invention, after a step of curing the curing adhesive so to bind the QRs, the method further comprises: attaching a protective substrate on the QR layer.

In yet another aspect of the present invention, the QR film comprises a polyimide (PI) alignment film and a polarizer.

According to the present invention, a quantum rod (QR) light-emitting display device comprises a backlight module and a display panel placed at a light-emitting side of the backlight module, with the display panel comprising a first substrate, a first polarizer that is attached to an internal side of the first substrate, a second substrate that is close to the backlight module and disposed opposite to the first substrate with a space in between, a second polarizer that is attached to an external side of the second substrate, and a QR film that is installed between the first substrate and the second substrate. The QR film is placed between the first substrate and the second polarizer. The QR film comprises: a substrate; a transmissive film with a plurality of stripe-shaped slots on the substrate; a QR layer on the transmissive film, comprising curing adhesives, and the QRs and electric field-sensing monomers doped in the curing adhesive, wherein directions of the long axes of the QRs are parallel to the transmission axis of the second polarizer, and when the electric field is applied to the QR layer, the electric field-sensing monomers are effected and spur the QRs to line along the stripe-shaped slots and be cured by the curing adhesive.

In one aspect of the present invention, the stripe-shaped slots are formed by imprinting the mask with a pattern complimentary to the stripe-shaped slots on the transmissive film.

In another aspect of the present invention, the stripe-shaped slots are parallel to each other and have a nano-sized width; the electric field-sensing monomers, under the effect of the electric field, spur the long axes of the QRs to line along the stripe-shaped slots.

In still another aspect of the present invention, a direction of the electrical field is perpendicular to a surface of the substrate to the QR layer.

The method of forming QR films and QR light-emitting display device provided by an embodiment of the present invention is to apply an electric field to a QR layer, so that electric field-sensing monomers would spur QRs to line along pre-designed stripe-shaped slots. More specifically, the alignment of long axes of QRs is attained to through the alignment of directions of the stripe-shaped slots. If the directions of a plurality of stripe-shaped slots are the same and easily aligned to, the alignment of the long axes of QRs would be improved. It would enhance the luminance of the light emitted from the light-emitting side of the QR film, and further reduce energy consumption of the display device.

DETAILED DESCRIPTION OF PREFERRED EMBODIMENTS

The drawings illustrate embodiments of the invention and, together with the description, serve to explain the principles of the invention.

Figure 1:
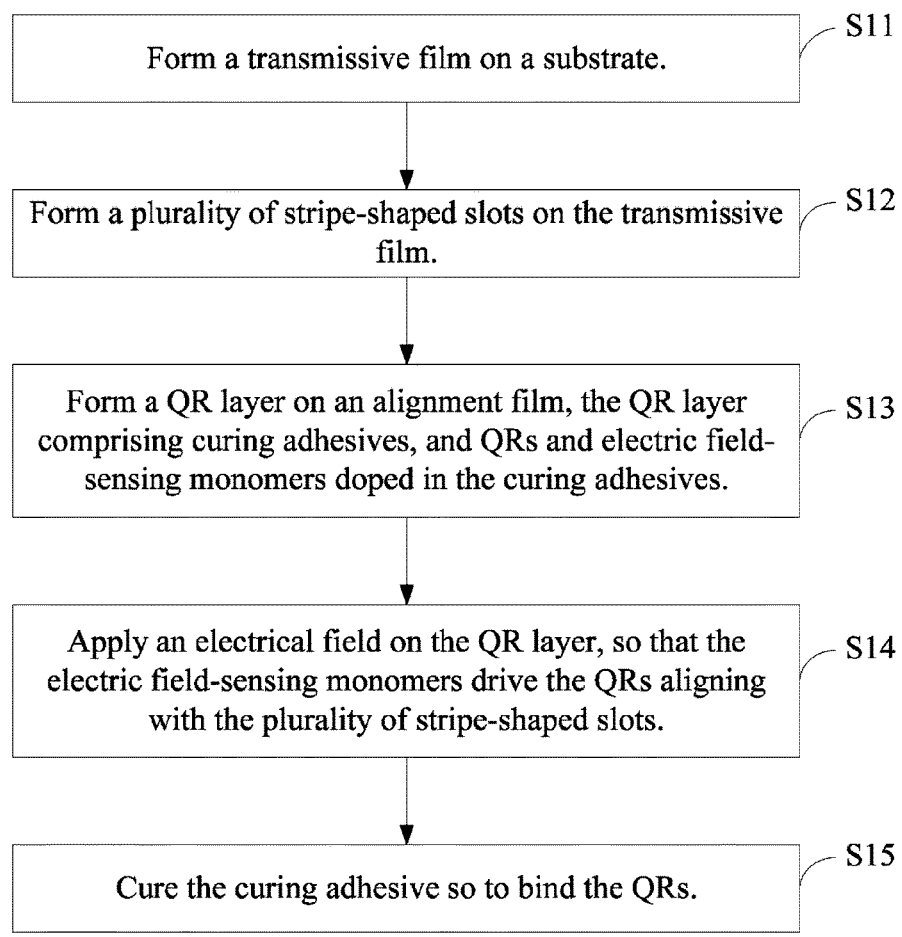
FIG. 1 is a flow chart of a method of forming a QR film according to a preferred embodiment of the present invention.

FIG. 1 is a flow chart that shows an embodiment of a method of forming a QR film of the present invention. The forming method of the present embodiment comprises the following steps:

Step S11: form a transmissive film on a substrate.

Figure 2:
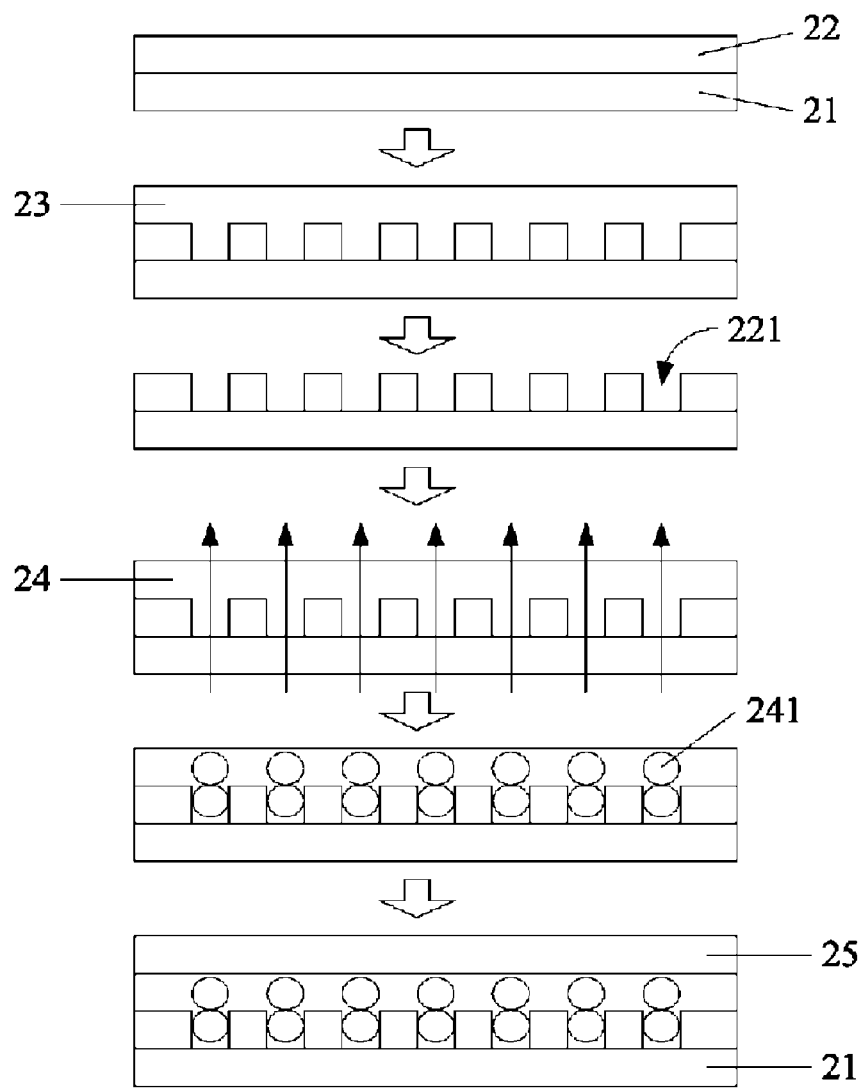
FIG. 2 shows a diagram of forming a QR film according to a preferred embodiment of the present invention.

As shown in FIG. 2, a substrate 21 is applied to form an optical film for the QR light-emitting display panel and QR light-emitting display device, so it must at least be transmissive. The materials for the substrate 21 should be waterproof and oxygen-resistant, such as glass, polyethylene terephthalate (PET) or plastic.

A transimissive film 22 can be a polyimide (PI) alignment film or optical thin film such as a polarizer. The method of forming the transmissive film 22 on the substrate 21 comprises but is not limited to chemical vapor deposition (CVD), low-pressure chemical vapor deposition (LPCVD), plasma enhanced chemical vapor deposition (PECVD), sputtering, coating, and vacuum evaporation.

Step 12: form a plurality of stripe-shaped slots on the transmissive film.

Please refer to FIG. 2. The present embodiment imprints a mask 23 on the transmissive film 22 to form a plurality of stripe-shaped slots 221 with a nano-sized width (e.g. the width can range from 20 nanometers to 200 nanometers). The mask 23 has a pattern that is complimentary to the stripe-shaped slots 221. Materials of the mask 23, preferably, are not easily deformed when heated or pressured. The material should also be easily processed into the plurality of nano-sized, stripe-shaped slots 221 and able to guarantee that the gap between the predetermined size of the slots 221 and the actual size of the slots 221 after the material is processed is the minimum.

The striped-shaped slots 221 control the direction of the long axes of QRs, therefore the direction of all the stripe-shaped slots 221 are parallel to each other and the direction of the long axes of QRs.

The embodiment of the present invention can also adopt other methods to form the plurality of striped-shaped slots 221 on the transmissive film 22. For example, the plurality of stripe-shaped slots 221 can be produced by etching the transmissive film 22, or directly forming a transmissive film 22 with a plurality of stripe-shaped slots 221 on the substrate 21.

Step 13: form a QR layer on an alignment film. The QR layer comprises curing adhesives, and QRs and electric field-sensing monomers doped in the curing adhesive.

The curing adhesive of the QR layer 24 can be light-curving adhesives, such as ultraviolet (UV) curing adhesive, shadowless adhesive, and photosensitive adhesive, or heat-curing adhesives.

Step S14: apply an electric field to the QR layer. Under the effect of the electric field, the electric field-sensing monomers drive the QRs to align with the stripe-shaped slots.

The present embodiment can apply an electric field perpendicular to the QR layer 24, as shown in FIG. 2. More specifically, the electric field applies to the QR layer 24 (as shown by the arrows in FIG. 2) is perpendicular to the surface of the substrate 21, therefore influencing the electric field-sensing monomers in the QR layer 24 to drive the long axes of QRs 241 to align with the extending direction of the stripe-shaped slots 221. In detail, under the effect of the electric field, the electric field-sensing monomers drive the QRs 241 to rotate until the long axes of the QRs 241 is aligned with the extending direction of the stripe-shaped slots 221.

Step S15: cure the curing adhesive so to bind the QRs.

Figure 3:
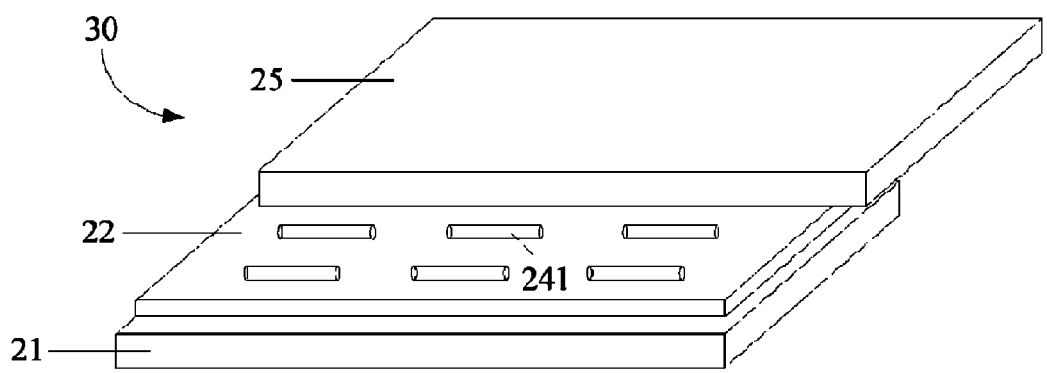
FIG. 3 shows a schematic diagram of a QR film according to a preferred embodiment of the present invention.

More specifically, attach a protective substrate 25 on the QR layer 24 with adhesives so to get the QR film 30, as shown in FIG. 3. Materials for the transmissive protective substrate 25 can be the same as or different from that of the substrate 21.

As such, the present embodiment, in practice, makes the alignment of long axes of QRs 241 contingent to the design of the direction of the stripe-shaped slots 221. Given that it is easier to align the stripe-shaped slots 221 to the same direction, it can also improve the alignment of the long axes of the QRs 241 and therefore enhance the luminance of the polarized light emitted from the light-emitting side of the QR film 30.

Figure 4:
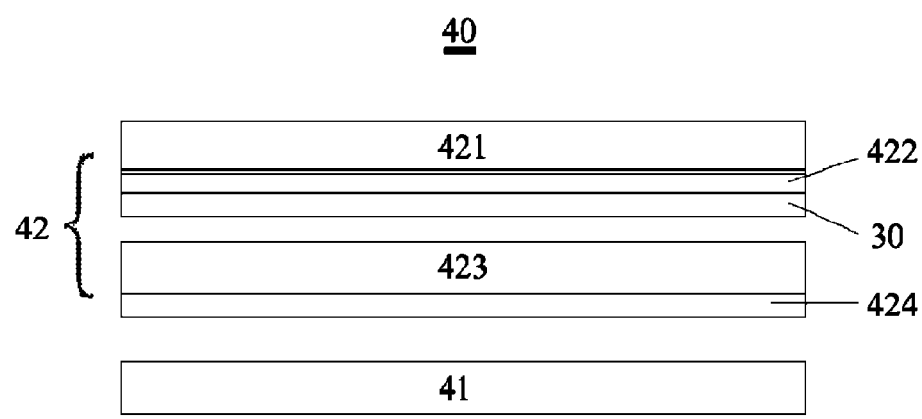
FIG. 4 shows a cross-sectional view of a QR light emitting display device according to a preferred embodiment of the present invention.

As shown in FIG. 4, the QR light emitting display device 40 equipped with the QR film 30 comprises a backlight module 41 and a display panel 42 placed at a light-emitting side of the backlight module 41. The display panel 42 comprises a first substrate 421, a first polarizer 422 attached to an internal side of the first substrate 421, a second substrate 423 disposed opposite to the first substrate 421 with a space in between, a second polarizer 424 attached to an external side of the second substrate 423, and the QR film 30 that is installed between the first substrate 421 and the second substrate 423. The second substrate 423 is installed close to the backlight module 41. The QR film 30 is disposed between the first substrate 421 and the second polarizer 423, and the direction of the long axes of the QRs in the QR film 30 is parallel to the transmission axis of the second polarizer 424.

Given that the direction of the long axes of the QR film 30 is better aligned, the light emitted from the backlight module 41, after polarized by the QR film 30, has higher luminance. Therefore, it reduces the energy consumption of the QR light-emitting display device 40.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of forming quantum rod (QR) films, comprising:

forming a transmissive film on a substrate;

making use of a mask to imprint the transmissive film so to form a plurality of stripe-shaped slots on the transmissive film, wherein the mask has a pattern complimentary to the stripe-shaped slots, with an extending direction of the stripe-shaped slots parallel to each other, and a width of the slots being nano-sized;

forming a QR layer on an alignment film, wherein the QR layer comprises curing adhesives, and QRs and electric field-sensing monomers doped in the curing adhesives;

applying an electrical field that is perpendicular to a surface of the substrate to the QR layer, so that under the effect of the electric field, the electric field-sensing monomers drive long axes of the QRs aligning with the extending direction of the plurality of stripe-shaped slots;

curing the curing adhesive so to bind the QRs; and attaching a protective substrate on the QR layer.

2. The method of claim 1, wherein the QR film comprises a polyimide (PI) alignment film and a polarizer.

3. A method of forming quantum rod (QR) films, comprising:

forming a transmissive film on a substrate;

forming a plurality of stripe-shaped slots on the transmissive film;

forming a QR layer on an alignment film, the QR layer comprising curing adhesives, and QRs and electric field-sensing monomers doped in the curing adhesives;

applying an electrical field on the QR layer, so that under the effect of the electric field, the electric field-sensing monomers drive the QRs aligning with the plurality of stripe-shaped slots; and curing the curing adhesive so to bind the QRs.

4. The method of claim 3, wherein a step of forming a plurality of stripe-shaped slots on the transmissive film comprises:

making use of a mask to imprint the transmissive film so to form a plurality of stripe-shaped slots on the transmissive film, the mask having a pattern complimentary to the stripe-shaped slots.

5. The method of claim 3, wherein an extending direction of the stripe-shaped slots parallel to each other, and widths of the slots are nano-sized, and a step of applying an electrical field on the QR layer comprises:

under the effect of the electric field, the electric field-sensing monomers drive long axes of the QRs aligning with an extending direction of the plurality of stripe-shaped slots.

6. The method of claim 5, wherein the step of applying an electrical field on the QR layer comprises:

setting a direction of the electrical field to be perpendicular to a surface of the substrate to the QR layer.

7. The method of claim 3, wherein after a step of curing the curing adhesive so to bind the QRs, the method further comprises:

attaching a protective substrate on the QR layer.

8. The method of claim 3, wherein the QR film comprises a polyimide (PI) alignment film and a polarizer.

9. A quantum rod (QR) light emitting display device, comprising a backlight module and a display panel placed at a light-emitting side of the backlight module, with the display panel comprising a first substrate, a first polarizer that is attached to an internal side of the first substrate, a second substrate that is close to the backlight module and disposed opposite to the first substrate with a space in between, a second polarizer that is attached to an external side of the second substrate, and a QR film that is installed between the first substrate and the second substrate; wherein the QR film is placed between the first substrate and the second polarizer, and comprises:

a substrate;

a transmissive film with a plurality of stripe-shaped slots on the substrate;

a QR layer on the transmissive film, comprising curing adhesives, and the QRs and electric field-sensing monomers doped in the curing adhesive, wherein directions of the long axes of the QRs are parallel to the transmission axis of the second polarizer, and when the electric field is applied to the QR layer, the electric field-sensing monomers are effected and spur the QRs to line along the stripe-shaped slots and be cured by the curing adhesive.

10. The QR light-emitting display device of claim 9, wherein the stripe-shaped slots is formed by imprinting the mask with a pattern complimentary to the stripe-shaped slots on the transmissive film.

11. The QR light-emitting display device of claim 9, wherein the stripe-shaped slots are parallel to each other and have a nano-sized width; the electric field-sensing monomers, under the effect of the electric field, spur the long axes of the QRs to line along the stripe-shaped slots.

12. The QR light-emitting display device of claim 9, wherein a direction of the electrical field is perpendicular to a surface of the substrate to the QR layer.

* * * * *